UNITED STATES PATENT OFFICE.

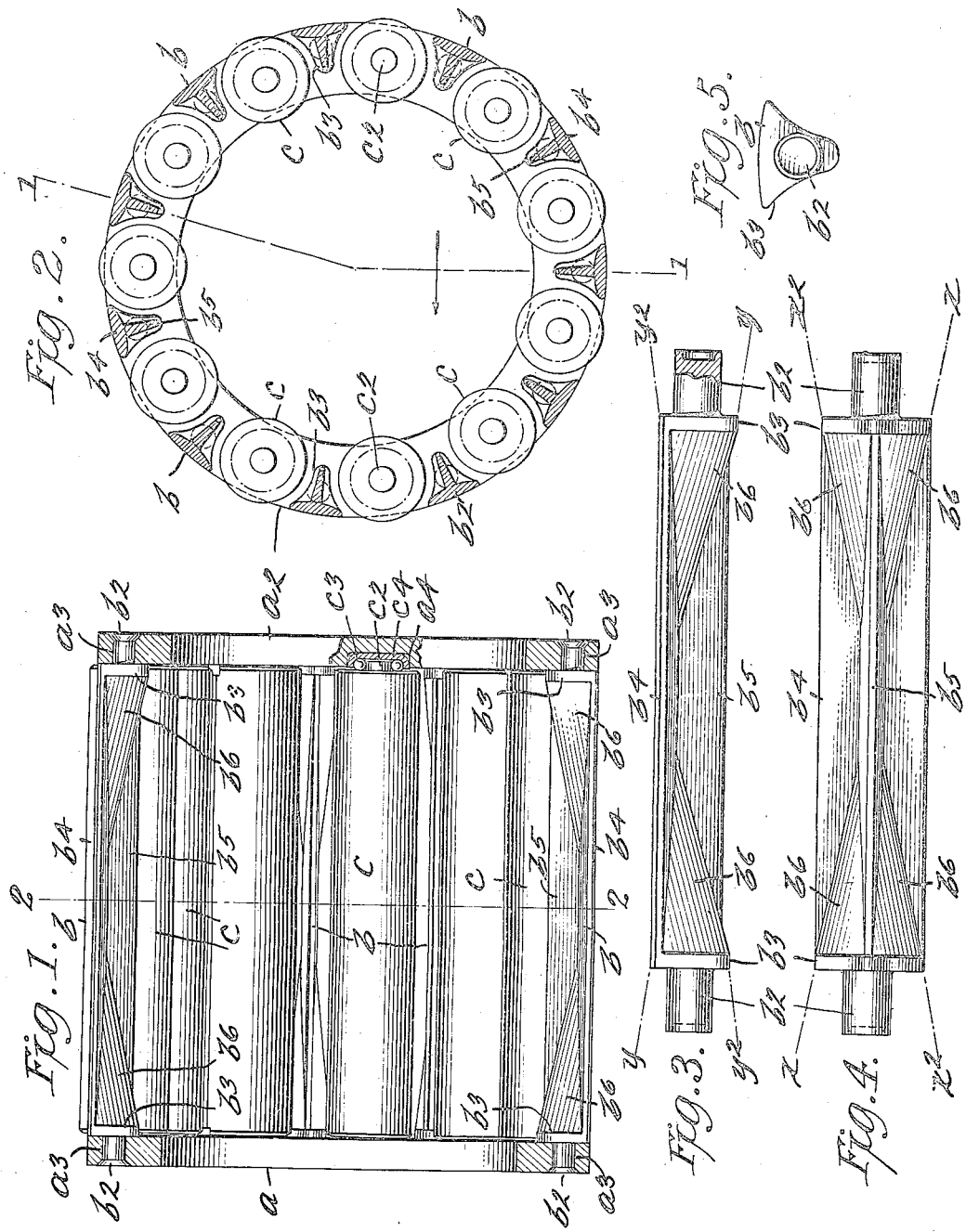

JULIUS A. PERKINS, OF NEW YORK, N. Y.

ROLLER-BEARING CAGE.

1,212,551. Specification of Letters Patent. Patented Jan. 16, 1917.

Application filed May 6, 1913, Serial No. 765,782. Renewed June 9, 1916. Serial No. 102,798.

*To all whom it may concern:*

Be it known that I, JULIUS A. PERKINS, a citizen of the United States of America, and residing at New York, in the county of New York and State of New York, have invented certain new and useful Improvements in Roller-Bearing Cages, of which the following is a specification, such as will enable those skilled in the art to which it appertains to make and use the same.

This invention has an especial application to roller bearing cages, with a particular reference to the ribs used for spacing the cage end plates, although it is also applicable for use in many other positions wherein the equivalent of said ribs are subjected to strain, especially torsional strain, and the main object thereof is to provide such ribs, beams, bars, rods, distance pieces, or the like which provide the maximum strength with the minimum weight. In such cages it is desirable to make the weight as little as possible and, at the same time, consistent with the required strength, as the only function performed by the cage is in guiding or alining the rollers in their planetary movement about the journal of a shaft or the like and, as ball bearings are frequently provided at the junctions of the roller ends with the cage end-plates, excessive or unnecessary weight of the cage would require larger and stronger balls than are actually needed for the purpose and thus precluding the possibility of using the same number of balls in the same spaces or else requiring that the cage end plates be made larger and heavier in order to provide correspondingly enlarged ball spaces, the ribs therefore practically determining the weight of the cage, and I have accordingly developed ribs of the minimum weight for given strength, or of greater strength for a given weight.

My invention is fully set forth in the following specification, of which the accompanying drawings form a part, in which the separate parts are designated by the same reference characters in each of the views, and in which:—

Figure 1 is a section taken through a cage provided with my improved spacing ribs, on the line 1—1 of Fig. 2; Fig. 2 is a section taken on the line 2—2 of Fig. 1; Fig. 3 is a longitudinal, side, view of one of the ribs detached from the cage, enlarged; Fig. 4 is a similar view of the inner face thereof, viewed from the axis of the cage; and Fig. 5 is an end view thereof.

In the drawings forming a part of this application I have shown a roller bearing cage comprising washer-shaped end plates $a$ and $a^2$, each of which is provided with a plurality of spaced bores $a^3$ therethrough, and said end plates are joined by means of ribs $b$ forming the basis of this application, each of said ribs being provided with end tenons $b^2$ adapted to enter corresponding bores $a^3$ and, when in such positions, the ends of the tenons are adapted to be flared by spinning or otherwise to lock the same in the end plates, this being clearly shown in Fig. 1. The ribs are equidistant and form roller spaces therebetween for rollers $c$, each of which has a reduced end tenon $c^2$ at each end bearing upon series of balls $c^3$ arranged in suitable recesses $a^4$ in the cage end plates, a hardened cup $c^4$ being interposed between the balls and the cage end plates in the present showing to avoid the necessity for hardening the cage, but the specific cage end plate construction forms no part of this invention, nor does the particular form of roller or roller alining means.

By reference to Figs. 3, 4 and 5, it will be seen that substantially triangular, segmental, end bases $b^3$ are provided for the ribs $b$ and of relatively great dimensions on both the peripheral and radial lines of the cage, this peripheral dimension being continued throughout the entire length of the rib between cage end plates, but only on the cage periphery, the central portion of the rib having a radially arranged web for a given distance, these parts of the ribs being indicated at $b^4$ and $b^5$, respectively, but, by reference to Figs. 1 and 3, it will be noted that I do not make the radial dimension of the web $b^5$ as great as the radial dimension of the end bases $b^3$.

The peripheral portion $b^4$ is gradually thickened from either rib end toward the center but not to a very marked degree, and the web $b^5$ is also outwardly tapered, in cross section, to meet the thickest portion of the part $b^4$, resulting in substantially a T-shaped product in cross section which possesses great strength with respect to its weight, and this T-formation is continued for a predetermined distance on either side of the transverse median line of the cage where it is interrupted by slanting portions $b^6$ extending from the edges of the rib bases $b^3$ to the intersections of their points with the central rib portion in a gradually weight reducing manner, the inclination of these portions $b^6$ being, in plan view, that of a line drawn between diagonal edges of the rib bases, as clearly shown by the lines $x-x$ and $x^2-x^2$, Fig. 4, whereby any torsional strain is taken upon the rib bases, at the cage end plates, in lines passing through the web $b^5$ centrally of the rib, in any rotary strain on either of the end plates in one direction or on both in opposite directions and, as the rib bases and peripheral rib portions $b^4$ are of the same peripheral dimensions, the lines of direction of strain lie in the peripheral portions $b^4$ at the point of greatest strain on the rib bases in such torsional end plate movement, thus providing the most material and strength where needed and eliminating the material toward the cage axis as the necessity for such torsional resistance becomes less.

The above is based upon the tendency to individual rotary movement of the cage end plates, because of untrue roller operation or for other reasons, but there is also a strain due to the end plates being forced, at times, in planes parallel to each other, such strain being resisted by the ribs at angles to the line of direction thereof in a manner similar to that already described, but those ribs in the said line of direction take the strain, from rib end to rib end, on lines $y-y$ and $y^2-y^2$, Fig. 3, and it will be seen that I provide ample shoulders on either side of the rib end tenons to take such strains diagonally through the heaviest and strongest parts of the ribs, and at angles sufficiently removed from the central longitudinal plane of the ribs to be highly effective in strain resistance, because of the leverage provided by the distance of the edges of the shoulders from the end tenons of the ribs, and the inclined portions $b^6$ are so placed and designed as to provide a maximum strength in the lines of greatest strain and only in such lines, as any extension of the said portions $b^6$ beyond such lines would result only in dead weight and waste material.

While strains of but two kinds have been referred to, it will be evident that combinations of these strains may occur, and possibly wrenching strains, or strains taken diagonally through the cage in the event of its falling to strike on one edge of one of the end plates, but by applying a ruler or straight-edge to the drawings in the direction and along the lines of any possible strain it will be seen that the greatest rib strength lies in such lines and that there is no excess material on the outside of such lines of direction of strain, thus resulting in a rib of minimum weight and of maximum strength.

Although my invention was designed primarily for use in roller bearings wherein rollers of considerable length were employed, I do not limit myself thereto, nor, indeed, to the use thereof in roller bearings, as many other uses therefor may arise without any material departure from the design shown, and, while I have shown integral rib tenons adapted to be riveted in the cage end plates, I may make the tenons separate and secure them in any desired manner in either the ribs or the end plates.

Having fully described my invention, what I claim as new, and desire to secure by Letters Patent, is:—

1. As an article of manufacture, for spanning the space between two elements and adapted to take any torsional strain therebetween, a rib of T-formation centrally of its length, end bases of substantially greater area than the cross-sectional area of said central portion and substantially triangular in configuration, and inclined portions extending from the edges of said bases toward said central rib portion, the material of said inclined portions being within lines drawn between diagonal shoulders of said bases to effect a minimum of weight and maximum of strength, and means for connection of said rib with said elements.

2. A cage for roller bearings, comprising end plates and connecting ribs, each of said ribs comprising a T-shaped central portion, bases of greater cross-sectional areas than said central portions, and inclined portions joining said end bases and said central portions and being confined within lines drawn between diagonal shoulders of said bases to reduce the weight of said rib to a minimum.

3. A cage for roller bearings, comprising end plates, having bores therethrough, and connecting ribs having end tenons locked in said bores, each of said ribs comprising a T-shaped central portion, end bases of substantially greater cross-sectional areas than said central portion, and inclined portions joining said bases and central portions and being confined within lines drawn between diagonal shoulders of said bases to reduce rib weight to a minimum.

4. A cage for roller bearings, comprising end plates and connecting ribs secured thereto, each of said ribs comprising a central T-shaped portion, end bases of substantially greater cross-sectional areas than said central portion, the peripheral portion of said rib being of the same peripheral dimension as said end bases, and inclined portions joining said bases and central portion, the inclination thereof being approximately that of a line drawn between diagonal shoulders of said end bases whereby excess material and weight is eliminated.

In testimony that I claim the foregoing as my invention I have signed my name in presence of the subscribing witnesses this 5 day of May, 1913.

JULIUS A. PERKINS.

Witnesses:
WILLIAM A. BOECKEL,
J. C. LARSEN.